(12) United States Patent
Xue et al.

(10) Patent No.: US 9,747,360 B2
(45) Date of Patent: Aug. 29, 2017

(54) MAPPING NON-RELATIONAL DATABASE OBJECTS INTO A RELATIONAL DATABASE MODEL

(71) Applicant: SAP SE, Walldorf (DE)

(72) Inventors: Xiaohui Xue, Courbevoie (FR); Mokrane Amzal, Courbevoie (FR); Mythili Gopalakrishnan, Los Altos, CA (US)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 27 days.

(21) Appl. No.: 14/792,809

(22) Filed: Jul. 7, 2015

(65) Prior Publication Data

US 2015/0310083 A1      Oct. 29, 2015

Related U.S. Application Data

(62) Division of application No. 14/055,344, filed on Oct. 16, 2013, now Pat. No. 9,152,690, and a division of application No. 13/338,451, filed on Dec. 28, 2011, now Pat. No. 8,589,450.

(51) Int. Cl.
*G06F 17/30* (2006.01)

(52) U.S. Cl.
CPC ........ *G06F 17/30595* (2013.01); *G06F 17/30* (2013.01); *G06F 17/30339* (2013.01); *G06F 17/30424* (2013.01); *G06F 17/30483* (2013.01); *G06F 17/30557* (2013.01); *G06F 17/30566* (2013.01)

(58) Field of Classification Search
None
See application file for complete search history.

(56) References Cited

U.S. PATENT DOCUMENTS

2011/0252049 A1* 10/2011 Marinescu ........ G06F 17/30448
707/769

* cited by examiner

*Primary Examiner* — Hung Q Pham
(74) *Attorney, Agent, or Firm* — Buckley, Maschoff & Talwalkar LLC

(57) ABSTRACT

According to some embodiments, information may be received about a non-relational database object, such as an InfoSet, InfoSet query, or Advanced Business Application Programming ("ABAP") function for an enterprise resource planning system. The non-relational database object may then be mapped into a relational database model, such as a model associated with a business intelligence platform. As a result, Structured Query Language ("SQL") inputs from a business intelligence platform may be used create reports based on information in an enterprise resource planning system.

12 Claims, 10 Drawing Sheets

FIG. 9

MAPPING NON-RELATIONAL DATABASE OBJECTS INTO A RELATIONAL DATABASE MODEL

CLAIM OF PRIORITY

This application is a divisional application of, and claims priority to, previously filed U.S. patent application Ser. No. 13/338,451 filed on Dec. 28, 2011 and previously filed U.S. patent application Ser. No. 14/055,344 filed on Oct. 16, 2013.

FIELD

Some embodiments relate to databases, such as those supported by a business process platform. More specifically, some embodiments relate to systems and methods to map non-relational database objects into a relational database model.

BACKGROUND

In some cases, a user interface may be associated with a relational database model, such as a table that is organized into rows and columns. For example, a user may provide a Structured Query Language input associated with the relational database model and receive business information (e.g., sales data, purchase order data, or information about employees) from one or more data sources in the form of a table or report.

Some information, however, may be stored in connection with non-relational database objects. For example, various objects might require different Application Programming Interface ("API") techniques to read the appropriate metadata and/or to query the data. Moreover, there may be no common language associated with the non-relational database objects.

Accordingly, an efficient mechanism for representing non-relational database objects into a relational database model may be addressed by some embodiments herein.

BRIEF DESCRIPTION OF THE DRAWINGS

FIG. 9 illustrates a display to query an InfoSet in accordance with some embodiments.

DETAILED DESCRIPTION

Figure 1:
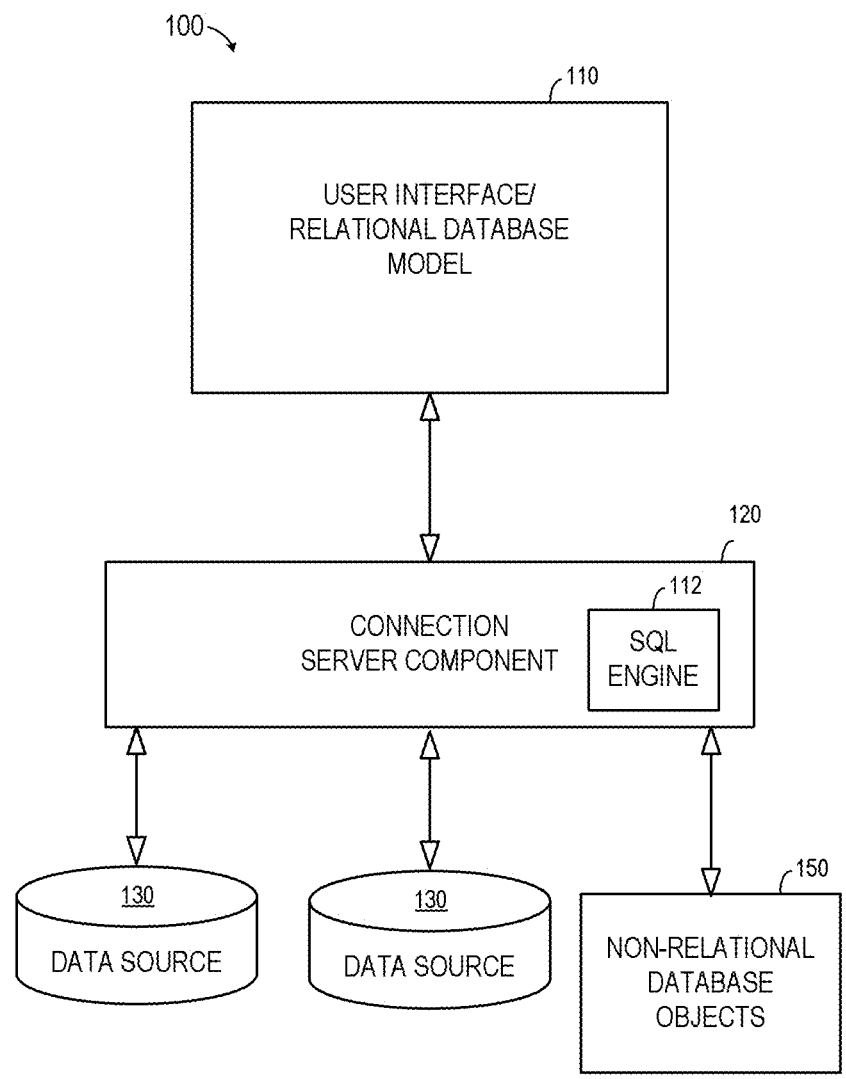
FIG. 1 is a block diagram of a system suitable for supporting various aspects of the present disclosure.

In some cases, a user interface may be associated with a "relational" database model, such as a table that is organized into rows and columns. For example, a user may provide a Structured Language Query input associated with the relational database model and receive business information (e.g., sales data, purchase order data, or information about employees) from one or more data sources in the form of a table or report. By way of example, FIG. 1 is a block diagram of a system 100 that includes a user interface associated with a relational database model 110 in accordance with some embodiments described herein. A user might enter an input query and receive data from various data sources 130 via a connection server component 120 (e.g., the user may send a query to an SQL engine 112 within the connection server component 120).

Some information, however, may be stored in connection with non-relational database objects 150. For example, these objects 150 might require different API techniques to read the appropriate metadata and/or to query the data. Moreover, there may be no common language associated with the non-relational database objects 150.

By way of example, the relational database model 110 might be associated with a SAP® BusinessObjects Business Intelligence platform and the non-relational database objects 150 may be associated with an Enterprise Resource Planning ("ERP") system. In this case, it might be difficult to allow reporting from the ERP system when it is integrated with the BOE platform.

Note that the connection server component 120 might facilitate communications between the BOE platform and ERP system. According to some embodiments described herein connection server component 120 may support reporting from the ERP system via "InfoSets," InfoSet queries, and/or Advanced Business Application Programming ("ABAP") functions. As used herein, the term "InfoSet" might be associated with, for example, an information provider and/or data source (e.g., in connection with joins for objects and/or time-dependent characteristics). Note that an InfoSet may represent a semantic layer over one or more data sources and might not itself be a data target.

Figure 2:
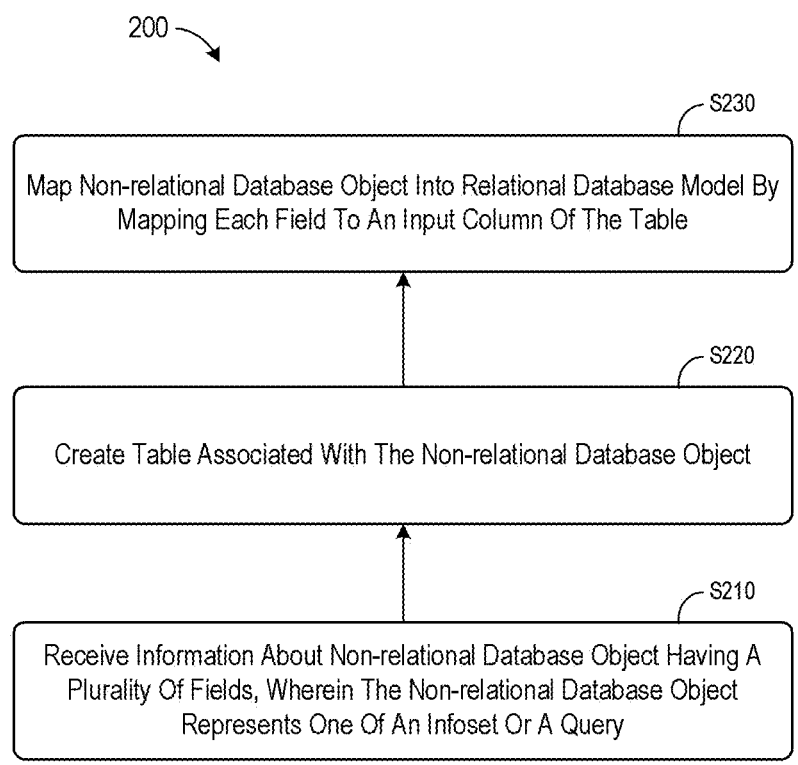
FIG. 2 is a flow diagram associated with mapping from InfoSet and InfoSet queries, in accordance with some embodiments.

Accordingly, an efficient mechanism for representing non-relational database objects into a relational database model may be addressed by some embodiments herein. Consider, for example, FIG. 2 which illustrates a method 200 that might be performed, for example, by some or all of the elements of the system 100 described with respect to FIG. 1 according to some embodiments. Note that any of the methods described herein may be performed by hardware, software, or any combination of these approaches. For example, a computer-readable storage medium may store thereon instructions that when executed by a machine result in performance according to any of the embodiments described herein.

At S210, information about a non-relational database object having a plurality of fields may be received, wherein the non-relational database object represents one of an InfoSet or an InfoSet query. The non-relational database object might be associated with, for example, an ERP system.

At S220, a table associated with the non-relational database object may be created. At S230, the non-relational database object may be mapped into a relational database model by mapping each field to a column of the table. The relational database model might be associated with, for example, a BOE platform. According to some embodiments, the table may then be used to facilitate generations of a report (e.g., responsive to a user input).

By way of example, InfoSets and queries might represent objects for ad-hoc reporting and may be organized inside local and/or global work areas. Each InfoSet may further be assigned to one or several user groups, and each query may be created inside a user group (and belong to that user group). According to some embodiments, such objects may be represented into a relational data base model that is composed of three levels:

(1) a database level where every work area may be mapped into a database;

(2) a schema where every user group may be mapped into a schema (and all the user groups of a work area may be under the database that represents) this work area; and (3) a table level where every InfoSet is mapped into a table. Note that all InfoSets of a work area may be under the qualifier representing that work area. According to some embodiments an artificial schema (e.g., named "InfoSet") may be provided and each InfoSet query may be mapped into a table. The InfoSet queries of a work area may be under the qualifier that represents that work area. Moreover, the InfoSet queries of a user group may be under the schema that represents that user group.

In this way, the fields of InfoSets may be mapped into columns of the corresponding table. Similarly, the fields of an InfoSet query may be mapped into columns of the corresponding table. Note that an InfoSet or InfoSet query might include one or more "selection" fields (e.g., fields on which user can put a filter when executing the query). According to some embodiments described herein, an optional input column may be provided in a table to be consumed by upper level applications. That is, when a non-relational database object comprises an InfoSet query that includes at least one selection field associated with a filter, the selection field may be mapped to an optional input column of the table. Note that each field other than the selection fields may instead be mapped to a normal column of the table.

Figure 3:
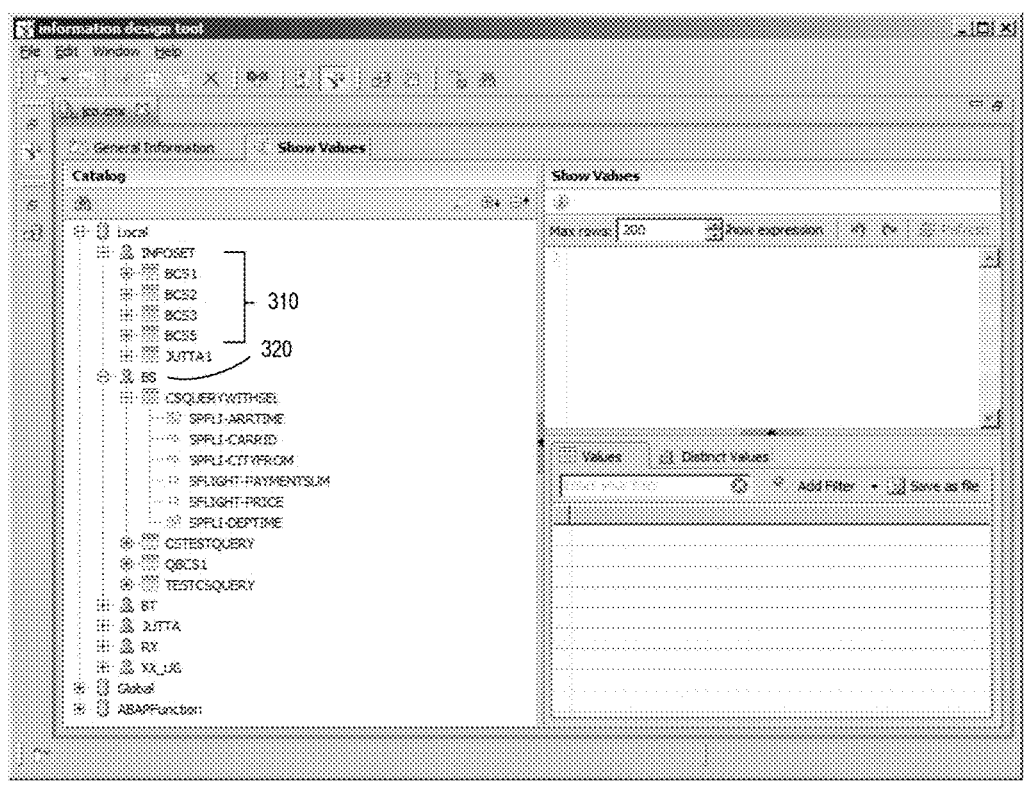
FIG. 3 illustrates a display representing InfoSets and queries in accordance with some embodiments.

Consider, for example, FIG. 3 which illustrates a display 300 representing InfoSets 310 and InfoSet queries 320 in accordance with some embodiments. In particular, FIG. 3 shows how these objects 310, 320 may represented and exposed in an information design tool. As a result of embodiments described herein, the mapping algorithm may reduce any effort for an authoring tool to connect to these objects 310, 320. Note that the InfoSet query 320 includes fields (SPFLI-AIRTIME, SPFLI-CARRID, etc.), each of which may be mapped to table columns. Moreover, the hierarchical nature of the display may let a user access multiple objects and/or fields simultaneously.

Figure 4:
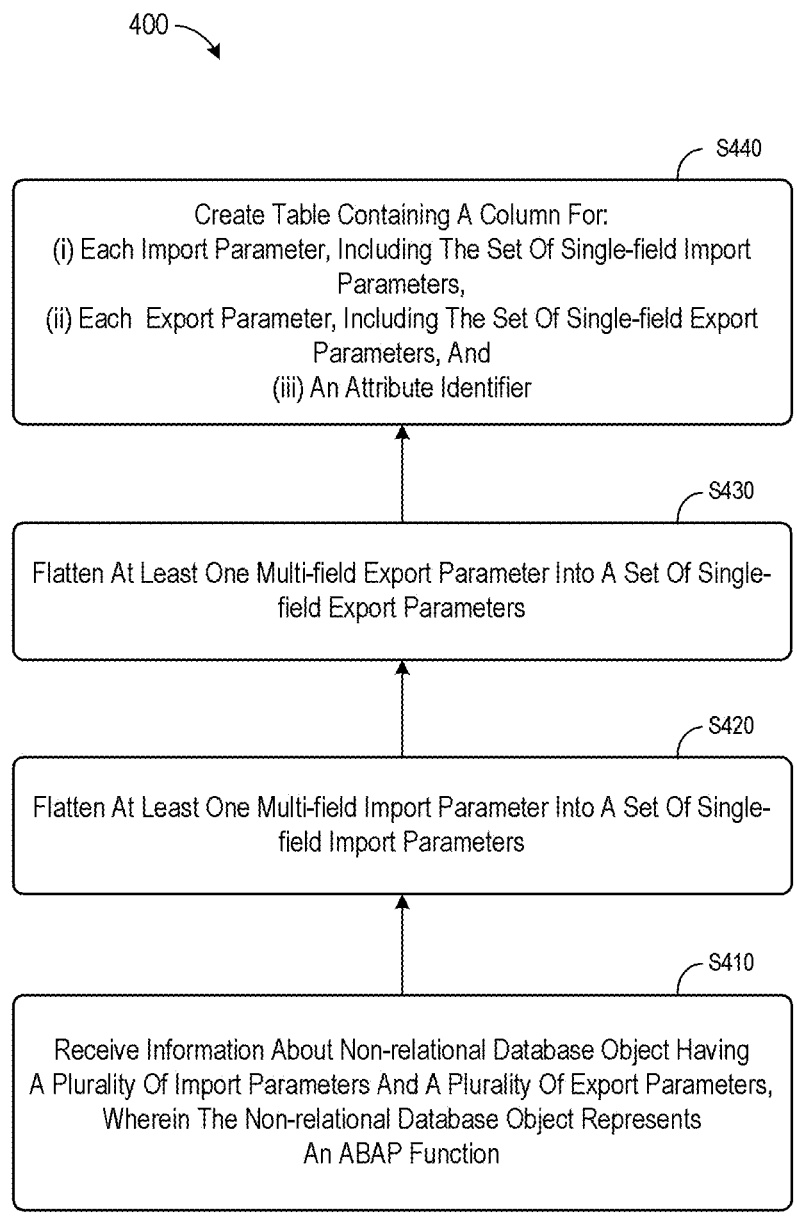
FIG. 4 is a flow diagram illustrating various aspects of the present disclosure according to some embodiments.

In addition to InfoSets and InfoSet queries, some embodiments described herein may be associated with ABAP functions. For example, FIG. 4 is a flow diagram 400 illustrating various aspects of the present disclosure according to some embodiments.

At S410, information about a non-relational database object having a plurality of import parameters and a plurality of export parameters may be received. Moreover, the non-relational database object may represent an ABAP function. Moreover, the non-relational database object might be associated with an ERP system and the relational database model may be associated with a BOE platform. According to some embodiments, the ABAP function includes at least one changing parameter that is translated into both an import parameter and an export parameter.

The ABAP function may then be mapped into a relational database model. In particular, at S420 at least one multi-field import parameter may be "flattened" into a set of single-field import parameters. Similarly, at S430 at least one multi-field export parameter may be flattened into a set of single-field export parameters. For example, a parameter IS that has two fields x and y may be flattened into $IS_{i\_x}$ and $IS_{i\_y}$ (each with a single field).

At S440, a table may be created such that it contains a column for: (i) each import parameter, including the set of single-field import parameters, (ii) each export parameter, including the set of single-field export parameters, and (iii) an attribute identifier. According to some embodiments, a report may then be generated in accordance with the mapping of the ABAP function into the relational database model.

According to some embodiments, the mapping described herein further comprises the creation of a primary key, for first table, composed of each import parameter and the attribute identifier. Moreover, when the ABAP function is associated with an output table parameter the mapping may further comprise creating a second table for the output table parameter, the second table containing a column for: (i) each import parameter associated with the ABAP function, (ii) all of the fields of the table, and (iii) one reference identifier attribute to reference the primary key of the first table. Note that the ABAP function might be associated with a plurality of output table parameters, in which case a separate table may be created for each output table parameter. Further, in some cases an output table parameter may be nested within another table.

According to some embodiments, ABAP functions (also called function modules) may be arranged such that procedures are grouped by function groups. Moreover, every ABAP function might be associated with several parameters types:

(1) import parameters which are input arguments (import parameters may be optional or mandatory);

(2) export parameters which are output arguments;

(3) changing parameters which are arguments that may be used for both input and output; and (4) table parameters which are tables that may be used for both input and output.

Moreover, the import, export and changing parameters can be of various types: a primitive ABAP type; a structure of any type (e.g., primitive or not); or a table of other types (e.g., a primitive type, a structure, or another table). According to some embodiments described herein an ABAP function may be represented or mapped into relational data base model that is composed of three levels:

(1) a catalog level where tables representing ABAP functions may be under an "ABAPFuntion" catalog;

(2) a schema level where every ABAP function group may mapped into a schema; and (3) a table level where tables representing an ABAP are under the schema of the corresponding function group.

In order to represent or map an ABAP function into tables, according to some embodiments the changing and table parameters may be considered twice, once as import parameters and once as export parameters. In this way, the model may be simplified such that an ABAP function will only have import and export parameters.

According to some embodiments, all input tables may be considered as input structures. Note that functions that allow reporting from an ERP system are not usually associated with input tables. Consider an ABAP function F with the following parameters:

import parameters $IP_1, \ldots, IP_n, IS_1, \ldots, IS_n$;

export parameters $EP_1, \ldots, EP_n, ES_1, \ldots, ES_n, ET_1, \ldots, ET_n$;

where $IP_i$ and $IS_i$ represent respectively input primitive parameters and input structure parameters. $EP_i$, $ES_i$, $ET_i$ represent output primitive parameter, output structure parameters and output table parameters. In this case, the mapping of these ABAP functions into tables may be associated with the following three main rules.

First, all structures (in input or output parameters) may be flattened. That is, given a structure parameter $IS_i$ that has two fields x and y, $IS_i$ may be replaced by $IS_{i\_x}$ and $IS_{i\_y}$ as parameters.

Second, one table may be created to map the main function. This table may contain $IP_1, \ldots, IP_n, IS_1, \ldots, IS_n$ (where $IS_1, \ldots, IS_n$ are flattened following the first rule). These columns may be indicated as input columns, which are the columns of a table on which an equality condition must be given when querying the table. If an import parameter is optional, then the corresponding input column may be an optional input column. If the import parameter is mandatory, then the corresponding input column may be a mandatory input column. This table also contains $EP_1, \ldots, EP_n, ES_1, \ldots, ES_n$ (where $ES_1, \ldots, ES_n$ are flattened following the first rule). Finally, the table may contain one attribute identifier. The primary key of this table may be composed of, for example, $IP_1, \ldots, IP_n, IS_1, \ldots, IS_n$ and the identifier.

Third, for every output table parameter or a nested output table, one table may be created and may include: $IP_1, \ldots, IP_n, IS_1, \ldots, IS_n$; all the fields of the table, and one created identifier attribute. According to some embodiments, one created REF_ID attribute may reference the identifier of the containing table. Moreover, the primary key of the table may be composed of $IP_1, \ldots, IP_n, IS_1, \ldots, IS_n$ and the identifier. Moreover, a foreign key may reference the key of the containing table.

Figure 5:
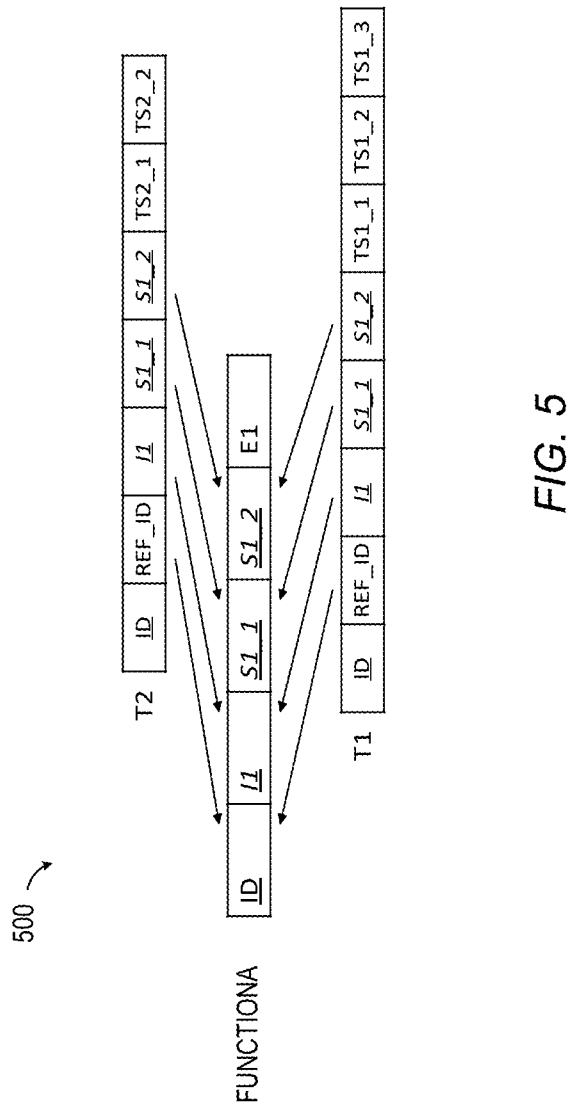
FIG. 5 illustrates tables mapping from an ABAP function in accordance with some embodiments.

Consider, for example, FIG. 5 illustrates 500 tables T1, T2 mapping to a function FunctionA in accordance with some embodiments. Given in this example, the ABAP function FunctionA has one import primitive type parameter I1 and one import structure parameter S1, wherein S1 has two primitive fields S1_1 and S1_2. FunctionA also has one export primitive type parameter E1 and two export table parameters T1 and T2. T1 is defined from the structure TS1, which has three primitive fields TS1_1, TS1_2, TS1_3; and T2 is defined from the structure TS2, which has two primitive fields TS2_1, TS2_2.

As illustrated in FIG. 5, three tables may be created to represent FunctionA:

Table "FunctionA" contains all input parameters I1, S1_1, S1_2 and the output parameter E1. The primary key is the combination of ID, I1, S1_1, and S1_2.

Table "T1" contains I1, S1_1, S1_2 and the fields of T1, the primary key is the combination of ID, I1, S1_1, S1_2, and a foreign key references the table "FunctionA."

Table "T2" contains I1, S1_1, S1_2 and the fields of T2, the primary key is the combination of ID, I1, S1_1, S1_2, and a foreign key references the table "FunctionA."

Note that all three tables have the same input columns: I1, S1_1, and S1_2 (illustrated using italic font in FIG. 5). Note that this mapping algorithm may have several advantages. For example, since it repeats input columns in all the tables each table can be independently queried if desired to represent a subset of an ABAP Function. Moreover, the primary keys and foreign keys that are defined on the tables issued from the same ABAP function, which may permit reconstituting the global output of an ABAP function.

Figure 6:
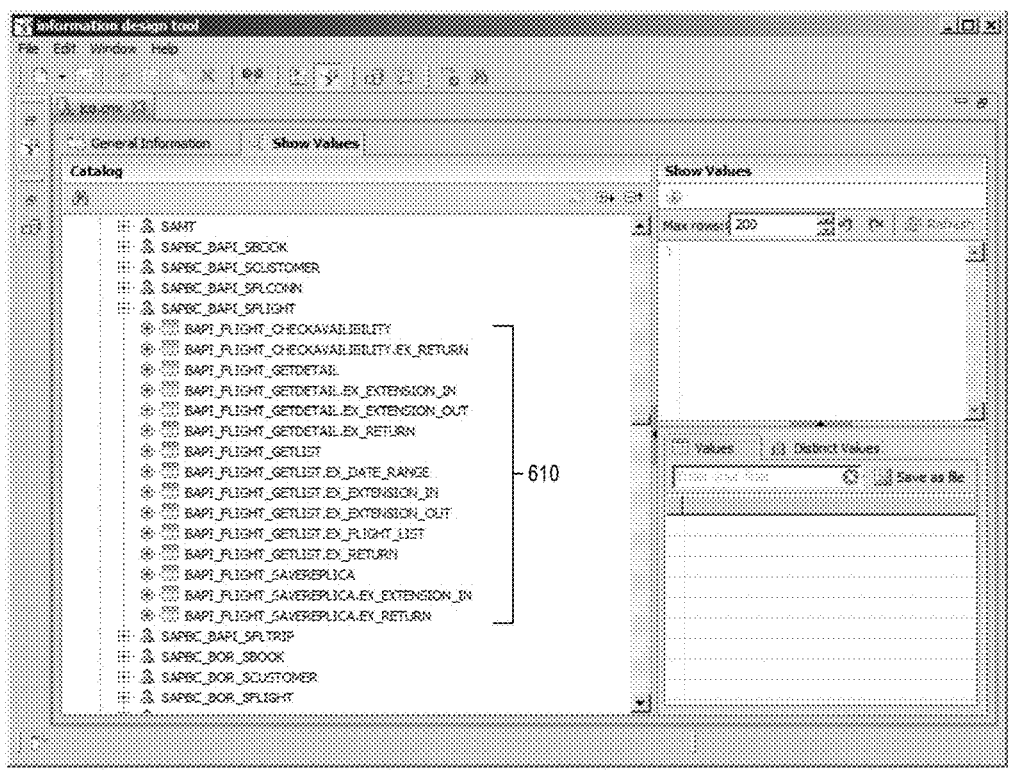
FIG. 6 illustrates a display with an exposed ABAP function for an information design tool in accordance with some embodiments.
Figure 7:
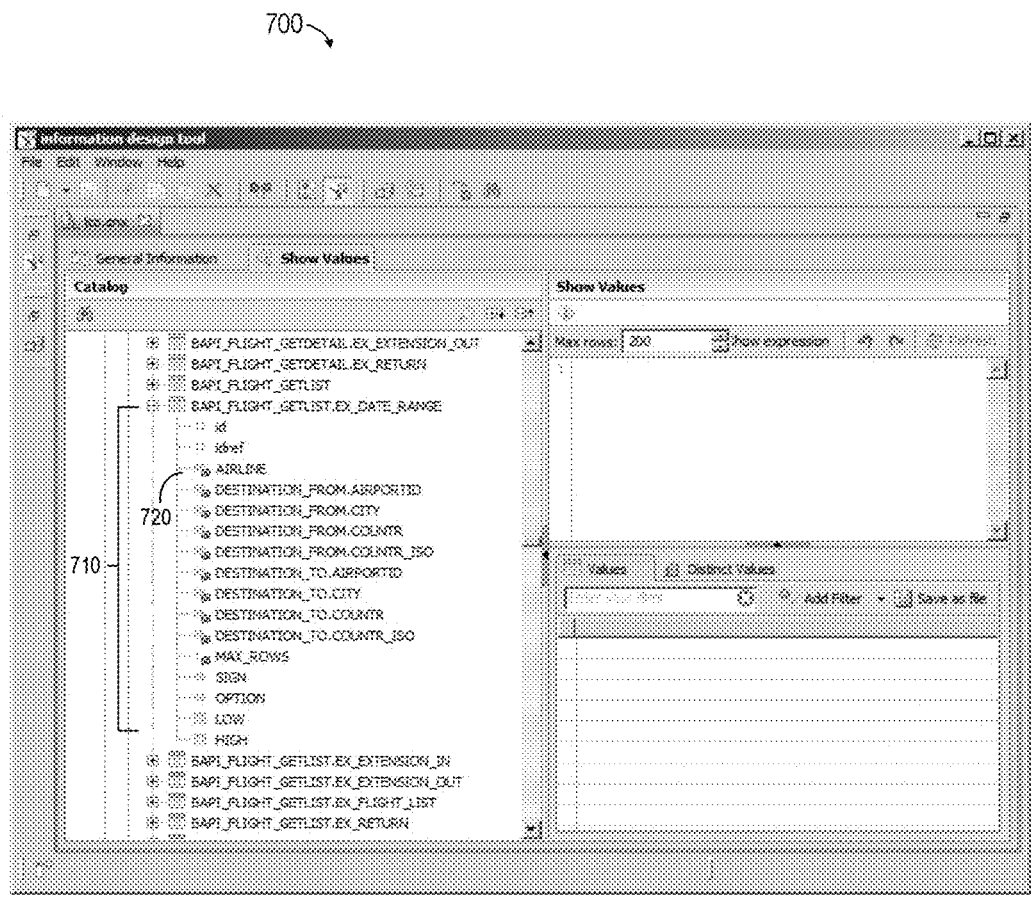
FIG. 7 illustrates a display with some exposed ABAP function parameters in accordance with some embodiments.

FIG. 6 illustrates a display 600 with an exposed ABAP function for an information design tool in accordance with some embodiments. That is, the display 600 shows tables 610 that represent ABAP functions within the function group "SAPBC_BAPI_SFLIGHT." Note that there are 15 separate tables 610 that represent four different ABAP functions. FIG. 7 illustrates a display 700 with exposed ABAP function parameters in accordance with some embodiments. That is, the display 700 illustrates how import arguments of the function BAPI_FLIGHT_GETLIST are exposed as input columns 710 for the table BAPI_FLIGHT_GETLIST.EX_DATE_RANGE. Note that they may be similar to normal columns except that an "@" sign may be added to the column icon 720. When a user wants to query the table, he or she may provide an equal condition for all of these input columns.

Figure 8:
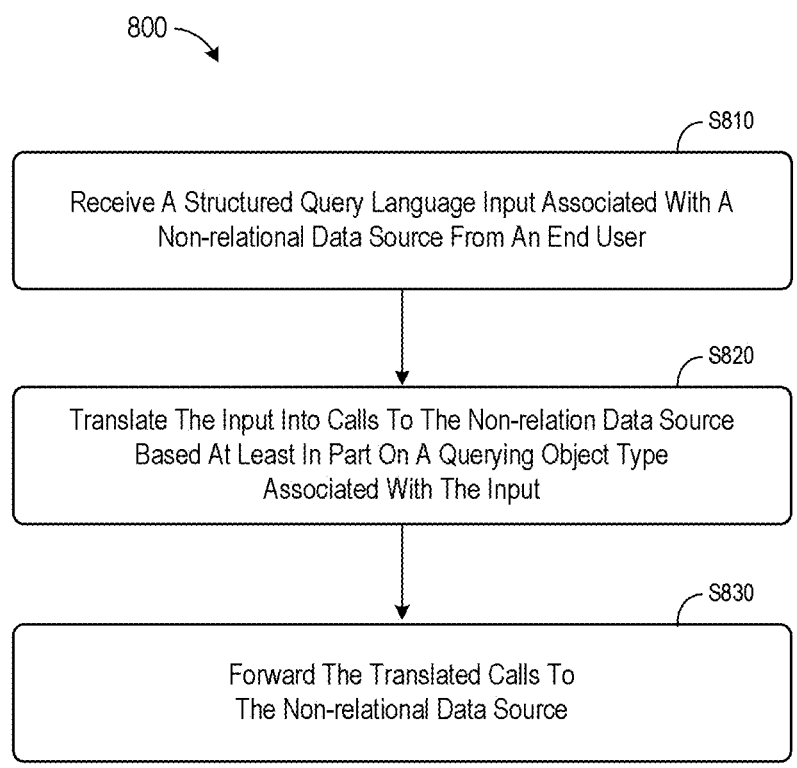
FIG. 8 is a flow diagram illustrating various aspects of the present disclosure according to some embodiments.

Referring again to FIG. 1, note that the SQL engine 112 may be provided for the relational database model 110. FIG. 8 is a flow diagram 800 illustrating various aspects of the present disclosure according to some embodiments. At S810, an interface may receive from an end user an SQL query (e.g., associated with a BOE platform) or input associated with a non-relational data source (e.g., an ERP system). The SQL input may be, for example, associated with: (i) projection, (ii) filtering, (iii) ordering, (iv) grouping, (v) an aggregate function, (vi) a nested query, and/or (vii) joining on a primary key and foreign key constraint.

At S820, an SQL engine coupled to the interface may translate the input into calls to the non-relational data source based at least in part on a querying object type associated with the input. The querying object type might comprise, for example: (i) an InfoSet, (ii) an InfoSet query, or (iii) an ABAP function. The SQL engine may then forward the translated calls to the non-relational data source at S830. That is, SQL engine may detect, based on the querying object type, a subset of the input that can be handled by the non-relational data source.

Note there may be no one query language available to access InfoSets, queries and ABAP functions. Instead, there may be ad-hoc interfaces to query each of these objects. To allow a query of ERP objects in a way similar to a classical relational data source, some embodiments may provide a SQL that is a sub-set of the typical SQL-92 standard. In this way, a user may send an SQL query the same way as he or she would with a classical relational data source. The SQL engine may, depending on the type of object the SQL query is targeting, translate the SQL query into calls to InfoSet, query, and/or to ABAP functions. The querying capability provided by an SQL engine might include, for example, projection, filtering, an "order by" operation, a "group by" operation, aggregate functions, nested queries, and/or joining on primary key/foreign key constraints (to allow joining tables that are issued from the same ABAP function).

Note that all of these operations might not be supported by an underlying system. As a result, depending on the querying object (InfoSet, query or ABAP function), the SQL engine may detect that a subset of the query can be processed by an ERP server and only forward these operations. The other operations may handled by the SQL engine. In this way, users of BOE products may not need to care about the capability of the ERP server in connection with InfoSets, InfoSet queries, and/or ABAP functions. According to some embodiments, the SQL engine may be transparent to end users.

Figure 9:
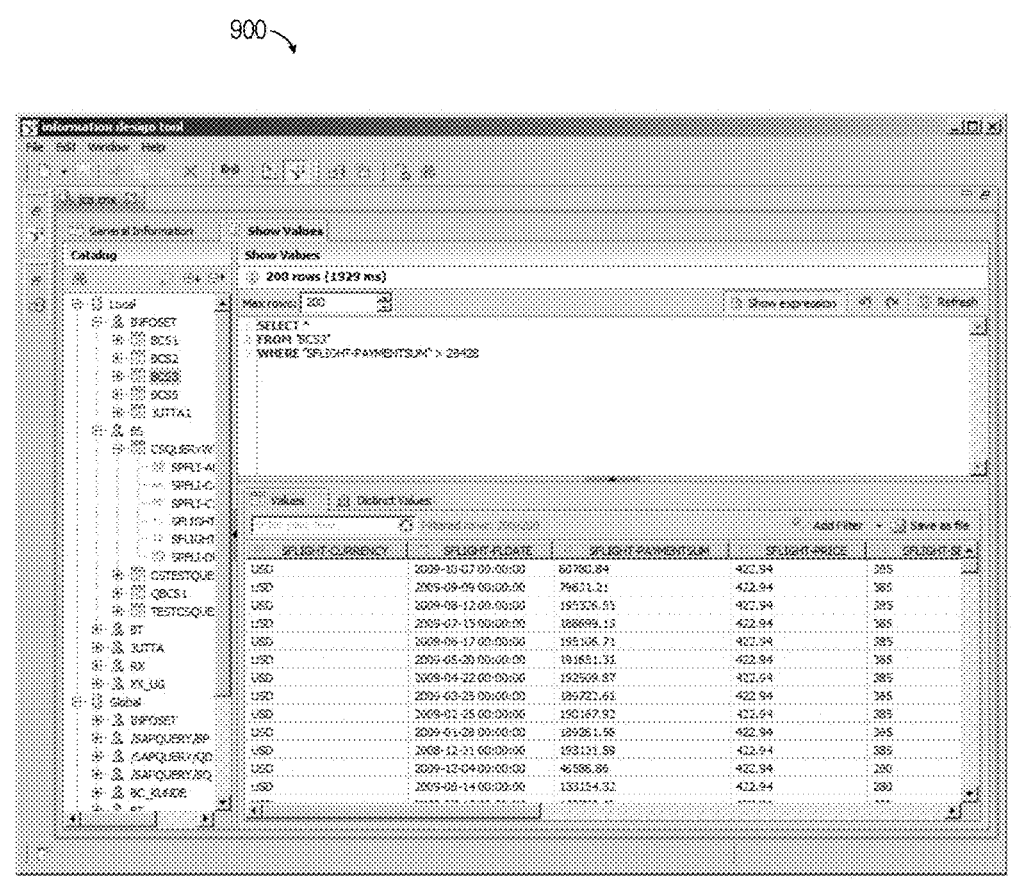

FIG. 9 illustrates a display 900 to query an InfoSet in accordance with some embodiments. The query to the InfoSet may be, for example, expressed by an end user and an engine or driver may translate the SQL into calls to query the InfoSet by first creating a query from the InfoSet (as an InfoSet cannot be queried directly). The engine or driver may then queries the generated query to get the result and finally removes the generated SAP Query.

Figure 10:
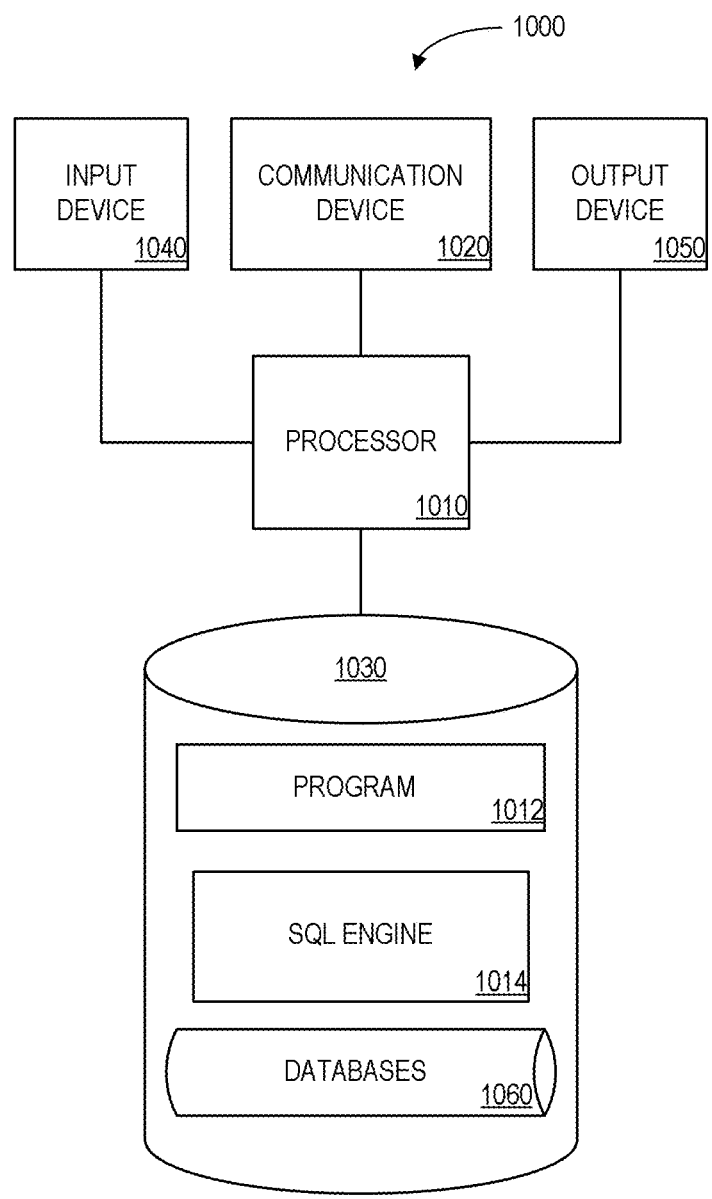
FIG. 10 is a detailed block diagram of a platform according to some embodiments.

The processes described herein may be performed by any suitable device or apparatus. FIG. 10 is one example of a platform 1000 according to some embodiments. The platform 1000 may be, for example, associated with some or all of the elements described in connection with system 100 of FIG. 1. The platform 1000 comprises a processor 1010, such as one or more commercially available Central Processing Units (CPUs) in the form of one-chip microprocessors, coupled to a communication device 1020 configured to communicate via a communication network (not shown in FIG. 10). The communication device 1020 may be used to communicate, for example, with one or more remote devices. The platform 1000 further includes an input device 1040 (e.g., a mouse and/or keyboard to enter SQL queries and associated parameters) and an output device 1050 (e.g., a computer monitor to display reports and/or tables).

The processor 1010 also communicates with a storage device 1030. The storage device 1030 may comprise any appropriate information storage device, including combinations of magnetic storage devices (e.g., a hard disk drive), optical storage devices, and/or semiconductor memory devices. The storage device 1030 stores a program 1012 and/or SQL Engine 1014 for controlling the processor 1010. The processor 1010 performs instructions of the programs 1012, 1014, and thereby operates in accordance with any of the embodiments described herein. For example, the processor 1010 may receive information about a non-relational database object, such as an InfoSet, InfoSet query, or ABAP function for an ERP system. The non-relational database object may then be mapped by the processor 1010 into a relational database model, such as a model associated with a BOE platform. As a result, SQL inputs from the BOE platform may be used create reports based on information in the ERP system.

The programs 1012, 1014 may be stored in a compressed, uncompiled and/or encrypted format. The programs 1012, 1014 may furthermore include other program elements, such as an operating system, a database management system, and/or device drivers used by the processor 1010 to interface with peripheral devices. As used herein, information may be "received" by or "transmitted" to, for example: (i) the platform 1000 from another device; or (ii) a software application or module within the platform 1000 from another software application, module, or any other source.

In some embodiments (such as shown in FIG. 8), the storage device 830 stores the database 860. The database 860 may, for example, comprise a database that contains business information such as the data described in connection with BOE platforms and/or ERP systems. Note that the databases mentioned herein are only examples, and additional and/or different information may be stored therein. Moreover, various databases might be split or combined in accordance with any of the embodiments described herein.

Thus, some embodiments may provide algorithms to map InfoSets, queries and ABAP functions into relational tables and/or an SQL engine or driver may enable querying these objects in a transparent way for a user. Moreover, some embodiments provide an algorithm to map one ABAP function into several relational tables and enable joins between the tables issued from the same function to reconstitute the original ABAP function result. Moreover, ABAP function import parameters may be represented as input columns (and optional import parameters may be represented as optional input columns while mandatory import parameters are represented as mandatory input columns).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and user interface configurations have been described herein, not that any number of other configurations may be provided in accordance with embodiments of the present invention (e.g., a relational database model, connection server component, data sources, and non-relational database objects may be remote from each other or co-located). Applicants have discovered that embodiments described herein may be particularly useful in connection with certain types of business information. Note, however, that other types of information may also benefit from the invention.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory, computer-readable medium storing program code executable by a computer processor to perform a method, wherein execution of the code causes the computer processor to:

receive a query to retrieve data from a non-relational database object representing one of an ABAP function, InfoSet or an InfoSet query, wherein the query is associated with a querying object type;

translate the received query into calls to one of the ABAP function, InfoSet or InfoSet query based on the associated querying object type to access the non-relational database object;

receive information about the non-relational database object having a plurality of fields, wherein the non-relational database object associated with an output table parameter;

create a first table associated with the non-relational database object, the first table comprising a primary key column and an input column where each primary key, in the primary key column, comprises an import parameter and an attribute identifier;

map the non-relational database object into a relational database model by mapping each field of the plurality of fields to the input column of the first table, wherein the mapping further comprises creating a second table for the output table parameter, the second table comprising a column for (i) each import parameter associated with one of the ABAP function, InfoSet or the InfoSet query (ii) each field of the first table and (iii) a reference identifier attribute to reference primary keys in the primary key column of the first table;

generate a query result corresponding to the received query from the created first and second tables; and display the generated query result.

2. The medium of claim 1, wherein the non-relational database object represents an InfoSet query that includes at least one selection field associated with a filter, wherein the selection field is mapped to an optional input column of the table.

3. The medium of claim 2, wherein each field other than the at least one selection field are mapped to a normal input column of the table.

4. The medium of claim 1, wherein the non-relational database object is associated with an enterprise resource planning system.

5. The medium of claim 4, wherein the relational database model is associated with a business intelligence platform.

6. The medium of claim 1, wherein execution of the instructions further cause the computer processor to:
generate a report in accordance with the mapping of non-relational database object into the relational database model.

7. A method comprising:
receiving a query to retrieve data from a non-relational database object representing one of an ABAP function, InfoSet or an InfoSet query, wherein the query is associated with a querying object type;
translating the received query into calls to one of the ABAP function, InfoSet or InfoSet query based on the associated querying object type to access the non-relational database object;
receiving information about the non-relational database object having a plurality of fields, wherein the non-relational database object associated with an output table parameter;
creating, via a processor, a first table associated with the non-relational database object, the first table comprising a primary key column and an input column where each primary key, in the primary key column, comprises an import parameter and an attribute identifier;
mapping the non-relational database object into a relational database model by mapping each field of the plurality of fields to the input column of the first table, wherein the mapping further comprises creating a second table for the output table parameter, the second table comprising a column for (i) each import parameter associated with one of the ABAP function, InfoSet or the InfoSet query (ii) each field of the first table and (iii) a reference identifier attribute to reference primary keys in the primary key column of the first table;
generate a query result corresponding to the received query from the created first and second tables; and
display the generated query result.

8. The method of claim 7, wherein the non-relational database object represents an InfoSet query that includes at least one selection field associated with a filter, wherein the selection field is mapped to an optional input column of the table.

9. The method of claim 8, wherein each field other than the at least one selection field are mapped to a normal input column of the table.

10. The method of claim 7, wherein the non-relational database object is associated with an enterprise resource planning system.

11. The method of claim 10, wherein the relational database model is associated with a business intelligence platform.

12. The method of claim 7, further comprising
generating a report in accordance with the mapping of non-relational database object into the relational database model.

* * * * *